United States Patent [19]
Kim

[11] Patent Number: 5,796,384
[45] Date of Patent: Aug. 18, 1998

[54] GAMMA CORRECTION CIRCUIT OF A LIQUID CRYSTAL DISPLAY USING A MEMORY DEVICE

[75] Inventor: Tae-Sung Kim, Suwon, Rep. of Korea

[73] Assignee: Samsung Electronics Co., Ltd., Suwon, Rep. of Korea

[21] Appl. No.: 575,878

[22] Filed: Dec. 21, 1995

[30] Foreign Application Priority Data

Dec. 21, 1994 [KR] Rep. of Korea .................. 94-35628

[51] Int. Cl.⁶ .................................................. H04N 5/202
[52] U.S. Cl. ........................................ 345/147; 348/674
[58] Field of Search ........................... 345/87, 89, 98, 345/100, 147; 348/674

[56] References Cited

U.S. PATENT DOCUMENTS

| | | | |
|---|---|---|---|
| 4,394,688 | 7/1983 | Iida et al. | 348/28 |
| 4,786,968 | 11/1988 | Kutner | 348/674 |
| 4,805,013 | 2/1989 | Dei et al. | 358/523 |
| 5,089,890 | 2/1992 | Takayama | 348/674 |
| 5,103,298 | 4/1992 | Kashimura et al. | 348/572 |
| 5,123,059 | 6/1992 | Hirosawa et al. | 382/272 |
| 5,132,796 | 7/1992 | Topper et al. | 348/674 |
| 5,196,924 | 3/1993 | Lumelsky et al. | 348/674 |
| 5,243,426 | 9/1993 | Murayama et al. | 348/674 |
| 5,282,036 | 1/1994 | Worley et al. | 348/674 |
| 5,301,021 | 4/1994 | Ogino et al. | 348/564 |
| 5,359,342 | 10/1994 | Nakai et al. | 345/89 |
| 5,446,831 | 8/1995 | Yamashita et al. | 395/102 |
| 5,453,757 | 9/1995 | Date et al. | 345/89 |
| 5,473,373 | 12/1995 | Hwung et al. | 348/254 |
| 5,483,256 | 1/1996 | Ohi | 345/98 |
| 5,519,518 | 5/1996 | Watanabe et al. | 349/57 |

*Primary Examiner*—Mark R. Powell
*Attorney, Agent, or Firm*—Cushman Darby & Cushman IP Group of Pillsbury Madison & Sutro, LLP

[57] ABSTRACT

An apparatus comprises an LCD with a gamma correction circuit which compensates for the non-linear characteristics of gamma. The gamma correction circuit includes a memory device for storing programmed data. The programmed data is used to make gamma constant and to make the light transmissivity vary linearly with the input image data. The memory device may be a ROM (Read Only Memory) or a RAM (Random Access Memory). The programmed data may be changed according to the characteristics of the liquid crystal being driven.

21 Claims, 3 Drawing Sheets

GAMMA CORRECTION CIRCUIT OF A LIQUID CRYSTAL DISPLAY USING A MEMORY DEVICE

BACKGROUND OF THE INVENTION (1) Field of the Invention

The present invention concerns a gamma correction circuit of a liquid crystal display (LCD) for compensating for the non-linear manner in which the light transmissivity (transmittance) of each liquid crystal varies with its applied voltage.

(2) Description of Related Art

FIG. 1 shows a V-T curve 1 algebraically representing the light transmissivity (T) of a liquid crystal varied with the voltage (V) applied to the liquid crystal. The gradation of contrast of an image may be determined using the straight line portion at the middle of the V-T curve. The image quality becomes better with an increase in the gradation number. The ratio of the light transmissivity to the applied voltage, defined as gamma, does not remain constant; rather it varies with the applied voltage as shown in FIG. 1. Hence, gamma must be corrected as shown by the dotted line 2 in FIG. 1 in order to make the image smooth.

Conventionally, an LCD is driven in accordance with input analog signals as shown in FIG. 2, or digital signals as shown in FIG. 3. In the case of analog signals, input signals 3 are modulated through a non-linear amplifier 4 and delivered to a drive circuit 5 to drive an LCD 6. However, it is too difficult to design an analog amplifier having the necessary characteristics to correct gamma.

On the other hand, FIG. 4 graphically illustrates a voltage distribution in relation to transmissivity for the circuit of FIG. 3, which uses digital input signals 7. The intervals between the applied voltages are varied in order to compensate for the non-linear characteristics of the liquid crystal in response to the applied voltages. Namely, the digital input signals 7 are analyzed by a voltage analyzer 8 to produce compensated voltages applied to the LCD. The voltage analyzer 8 utilizes variable resistances to produce gradation voltages. However, it is difficult to adjust the variable resistances to produce a desired applied voltage distribution. In addition, the values of the variable resistances vary with use over time.

SUMMARY OF THE INVENTION

It is an object of the present invention to provide an LCD gamma correction circuit which precisely performs gamma correction to produce video images of improved quality.

According to the present invention, an LCD is provided with a gamma correction circuit to compensate for the non-linear characteristics of gamma in the LCD. The gamma correction circuit comprises a memory device for storing data programmed to produce a constant gamma, to make the light transmissivity vary linearly with the applied voltages. The memory device may include a ROM (Read Only Memory) or RAM (Random Access Memory). The programmed data may be changed according to the characteristics of the liquid crystal.

BRIEF DESCRIPTION OF THE ATTACHED DRAWINGS

The present invention will now be described more specifically with reference to the attached drawings in which.

DETAILED DESCRIPTION OF PREFERRED EMBODIMENT

Figure 1:
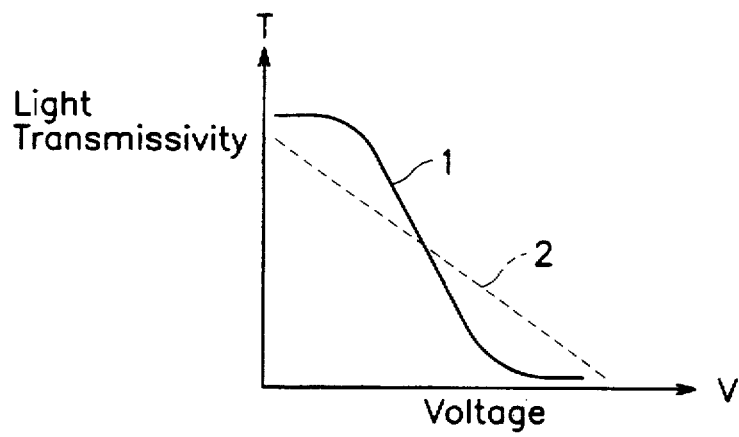
FIG. 1 shows a V-T curve 1 algebraically representing the light transmissivity (T) of a liquid crystal varied with the voltage (V) applied to the liquid crystal.
Figure 2:
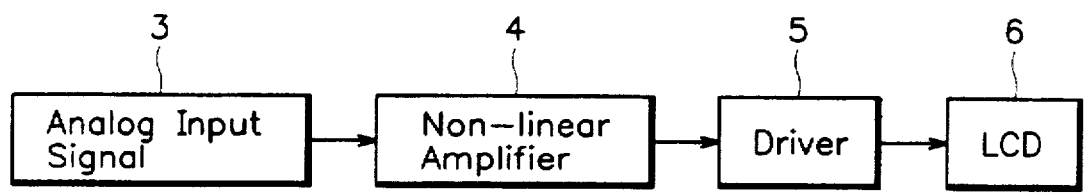
FIG. 2 is a block diagram illustrating a conventional gamma correction circuit for processing analog signals.
Figure 3:
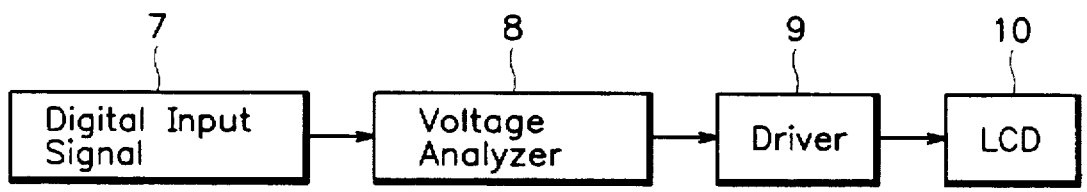
FIG. 3 is a block diagram illustrating another conventional circuit for processing digital signals.
Figure 4:
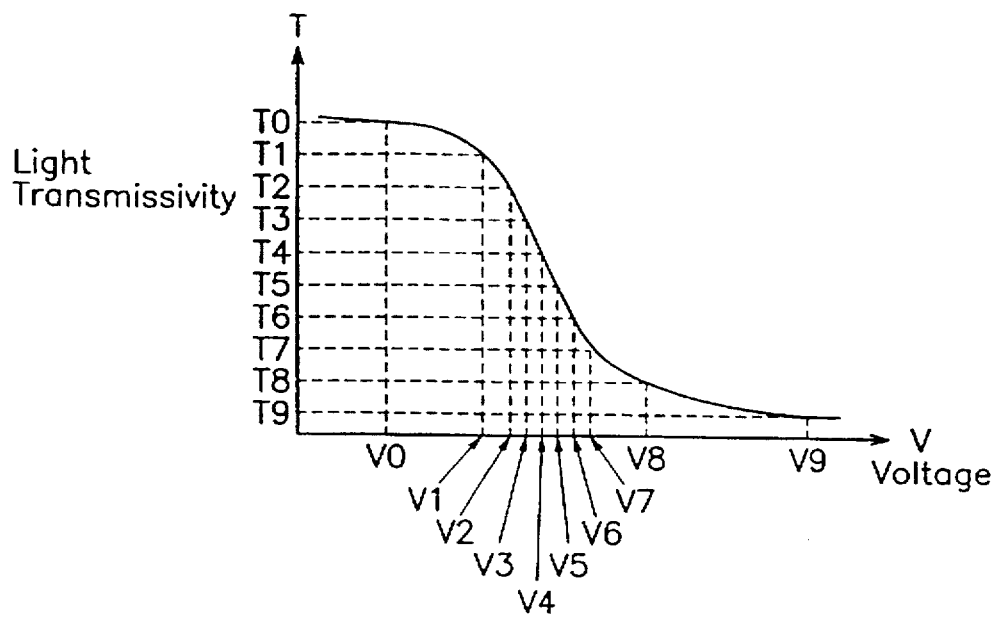
FIG. 4 is a graph illustrating a V-T curve used with digital signals.
Figure 5:
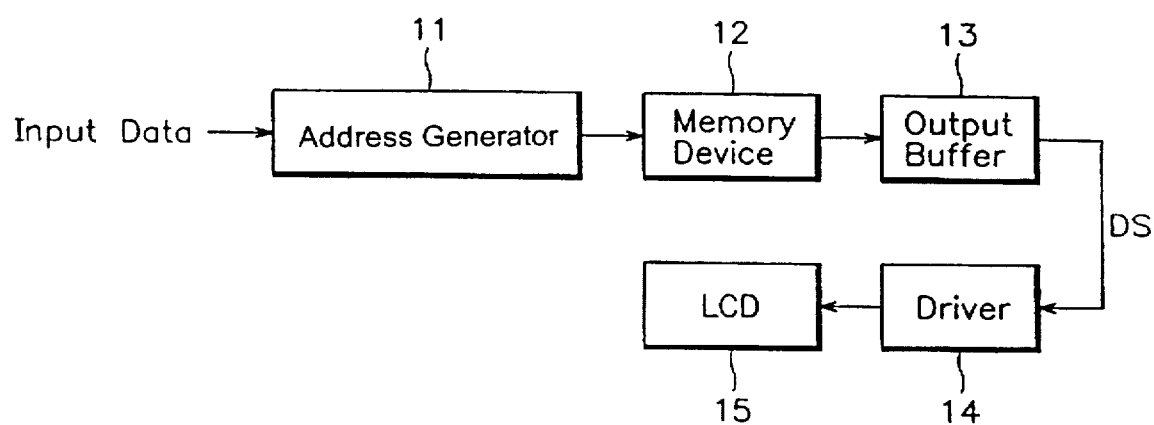
FIG. 5 is a block diagram illustrating a gamma correction circuit which processes digital signals according to the present invention.

Referring to FIG. 5, LCD driver 14 is placed between a gamma correction circuit and an LCD 15. The illustrated gamma correction circuit includes an address generator 11, a memory device 12, and an output buffer 13.

An input signal, comprising input values (e.g., voltage values) corresponding to various desired transmissivity levels of respective liquid crystals of LCD 15, is input to address generator 11. The input signal (referred to as input data in FIG. 5) includes input values which are used to control the transmissivity of respective liquid crystals of LCD 15. It is desired that the relationship between these values to the transmissivity of each liquid crystal be linear, so that each and every input value will result in the desired transmissivity value at the corresponding liquid crystal. However, as described above, the V-T curve associated with each liquid crystal is not usually linear. Therefore, in order to "correct" gamma, for every input value V, a modified input value V' is produced. The relationship between V and T is rendered linear, by using the modified input value V' to drive the liquid crystal. Referring to the specific circuitry of FIG. 5, V' is the value output from memory device 12, and V is the value input to address generator 11.

Each input value V (received as part of the input data shown in FIG. 5) is placed in an input buffer of address generator 11, and address generator 11 identifies an "address" corresponding to each individual input value V. An "address" is an address indicating where within memory device 12 the desired modified input value V' is stored.

More specifically, address generator 11 gathers plural input values V, and for each input value $V_i$, address generator 11 identifies an address value $A_i$ corresponding to that input value. Address generator 11 may do this (i.e., identify an address value corresponding to the input value) by ascertaining a desired transmissivity value $T_i$ which corresponds to the input value $V_i$; and then using a lookup table (or a similar pointing mechanism) to determine an appropriate address value $A_i$.

The address value $A_i$ points to an address within memory device 12 which corresponds to the modified input value $V_i'$ that would cause the desired transmissivity value $T_i$ to be achieved with the liquid crystal.

Memory device 12 includes conversion data which represents a V-T curve of a liquid crystal. That conversion data may comprise image data stored at various addresses within memory device 12. Address generator 11 identifies an address value for each input value. Each address value designates certain image data stored in memory device 12.

The image data stored within memory device 12 corresponds to the desired transmissivity of LCD 15 needed to accurately represent the image information being represented in the form of the input signal.

The image data is transferred to an output buffer 13 to produce a digital signal DS, according to which a driver 14 works the LCD 15. Namely, the input signal is properly converted to a corresponding digital signal determined according to the V-T characteristics of the LCD, and the gradation voltages are caused to vary linearly with the transmissivity.

Figure 6:
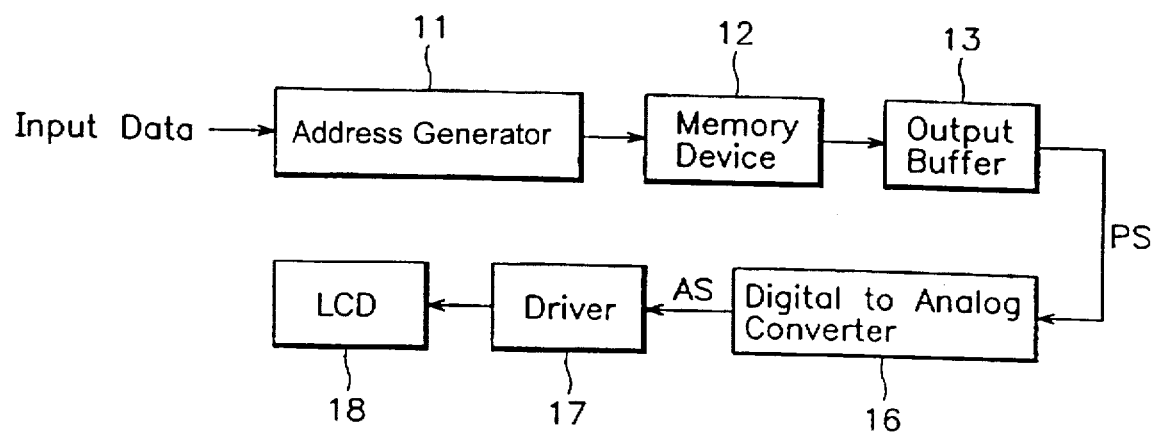
FIG. 6 is a block diagram illustrating another gamma correction circuit which processes analog signals according to the present invention.

When it is necessary to work the LCD with analog signals, a gamma correction circuit as shown in FIG. 6 may be provided. As shown in FIG. 6, an LCD driver 17 is placed between a gamma correction circuit and an LCD 18. The illustrated gamma correction circuit includes an address generator 11, a memory device 12, and an output buffer 13. The illustrated gamma correction circuit further includes a digital-to-analog converter 16 placed between an output terminal of output buffer 13 and an input of driver 17. D/A converter (digital-to-analog converter) 16 is used to convert the digital data produced by memory device 12 into corresponding analog signals (AS).

Figure 7:
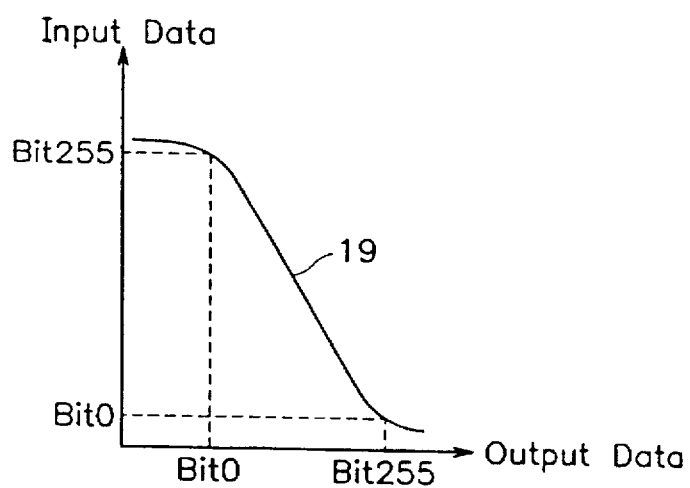
FIG. 7 is a graph for illustrating the data conversion of the inventive gamma correction circuit when employing 8-bit data.

In each of the gamma correction circuits illustrated herein, the polarity of the data output by memory device 12 may be periodically reversed to prevent degradation of the liquid crystals. The polarities of the output values may be alternated periodically, e.g., every time a new line or frame of input data is displayed. FIG. 7 illustrates a conversion table which may be used to reverse the polarities of the voltage values ouput by memory device 12, which will be used to drive the liquid crystals.

The present invention accordingly may easily perform gamma correction according to the characteristics of a liquid crystal by changing the programmed data stored in the memory device. Moreover, the inventive gamma correction circuit may be attached to a multi-scanning apparatus.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. An apparatus which compensates for non-linear characteristics of gamma for at least one liquid crystal of a liquid crystal display (LCD), said gamma being defined as a ratio of light transmissivity of said at least one liquid crystal to an input value, said apparatus comprising:

a gamma correction circuit which makes gamma substantially constant and makes said light transmissivity of said at least one liquid crystal vary substantially linearly with said input value, said gamma correction circuit receiving an applied input value for causing said at least one liquid crystal to respond with a desired light transmissivity, said gamma correction circuit further including a memory device for storing data programmed to produce an output value, in response to said applied input value only, for driving said at least one liquid crystal in place of said applied input value so that said at least one liquid crystal responds with said desired light transmissivity rather than an actual light transmissivity of said at least one liquid crystal corresponding to said applied input value.

2. The apparatus according to claim 1, wherein said memory device comprises one of a read only memory and a random access memory.

3. The apparatus according to claim 2, wherein said input value comprises a voltage level.

4. The apparatus according to claim 3, wherein said memory device comprises one of a read only memory and a random access memory.

5. The apparatus according to claim 3, wherein said programmed data may be changed according to the characteristics of said at least one liquid crystal.

6. The apparatus according to claim 3, further comprising a buffer for temporarily storing at least one of said applied input value and said output value.

7. The apparatus according to claim 3, further comprising a digital-to-analog converter.

8. The apparatus according to claim 1, wherein said programmed data comprises a plurality of output values having respective storage addresses.

9. The apparatus according to claim 8, wherein said gamma correction circuit further comprises means for receiving applied input values and means for specifying, for each of said applied input values, one of said storage addresses.

10. The apparatus according to claim 1, further comprising means for applying a voltage to said at least one liquid crystal in accordance with said output value.

11. The apparatus according to claim 10, further comprising means for periodically reversing a polarity of said voltage applied to said at least one liquid crystal.

12. A display apparatus which compensates for non-linear characteristics of gamma, gamma being defined as a ratio of light transmissivity to an input value, comprising:

a liquid crystal display having a plurality of liquid crystals; and a gamma correction circuit that makes gamma substantially constant and makes light transmissivity of said plurality of liquid crystals vary substantially linearly with different input values, said gamma correction circuit receiving applied input values for causing said liquid crystals to respond with desired light transmissivities, said gamma correction circuit further including a memory device for storing data programmed to produce output values, in response to said applied input values only, for driving said liquid crystals in place of said applied input values so that said liquid crystals respond with said desired light transmissivities rather than actual light transmissivities of said plurality of liquid crystals corresponding to said applied input values.

13. The apparatus according to claim 12, wherein said memory device comprises one of a read only memory and a random access memory.

14. The apparatus according to claim 13, wherein said programmed data may be changed according to the characteristics of said plurality of liquid crystals.

15. The apparatus according to claim 13, further comprising a buffer for temporarily storing at least one of said applied input values and said output values.

16. The apparatus according to claim 15, further comprising a digital-to-analog converter.

17. The apparatus according to claim 12, wherein said programmed data comprises a plurality of output values having respective storage addresses.

18. The apparatus according to claim 17, wherein said gamma correction circuit further comprises means for receiving said applied input values and means for specifying, for each of said applied input values, one of said storage addresses.

19. The apparatus according to claim 12, further comprising means for applying a voltage to said liquid crystals in accordance with each said output value.

20. The apparatus according to claim 19, further comprising means for periodically reversing a polarity of said voltage applied to said liquid crystals.

21. A gamma correction circuit for a liquid crystal display having at least a first liquid crystal and a second liquid crystal, said gamma correction circuit comprising:

means for receiving input data including first and second input values for respectively causing said first and second liquid crystals to exhibit desired light transmissivities;

a memory device that stores a first set of programmed data corresponding to said first liquid crystal, and a second set of programmed data corresponding to said second liquid crystal, said memory device being responsive to said first and second input values from said receiving means to provide first and second output values from said first and second sets of programmed data, respectively, said first and second output values correcting said first and second input values for non-linear characteristics of said first and second liquid crystals, respectively, so that said first and second liquid crystals exhibit said desired light transmissivities rather than actual light transmissivities different than said desired light transmissivities, caused by said non-linear characteristics, if said first and second input values were directly used to drive said first and second liquid crystals; and means for driving said first and second liquid crystals with said first and second output values, respectively.

* * * * *